United States Patent
Takiguchi et al.

(10) Patent No.: US 8,706,374 B2
(45) Date of Patent: Apr. 22, 2014

(54) ACCELERATOR PEDAL DEVICE

(75) Inventors: Hirotaka Takiguchi, Utsunomiya (JP);
Yoichi Sugimoto, Novi, MI (US);
Koichiro Takemasa, Utsunomiya (JP);
Taisuke Tsurutani, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 34 days.

(21) Appl. No.: 13/583,119

(22) PCT Filed: Feb. 16, 2011

(86) PCT No.: PCT/JP2011/053290
§ 371 (c)(1),
(2), (4) Date: Sep. 6, 2012

(87) PCT Pub. No.: WO2011/111489
PCT Pub. Date: Sep. 15, 2011

(65) Prior Publication Data
US 2012/0325042 A1 Dec. 27, 2012

(30) Foreign Application Priority Data

Mar. 9, 2010 (JP) ................................ 2010-051843

(51) Int. Cl.
*G06F 7/70* (2006.01)

(52) U.S. Cl.
USPC ................. 701/70; 701/78; 701/79; 180/170; 303/152; 74/513

(58) Field of Classification Search
USPC .................. 701/70, 78, 79, 83; 180/165, 170, 180/65.31; 303/152; 74/513
See application file for complete search history.

(56) References Cited

U.S. PATENT DOCUMENTS

| 5,253,172 | A | * | 10/1993 | Ito et al. ........................... 701/41 |
| 5,309,361 | A | * | 5/1994 | Drott et al. ......................... 701/1 |
| 5,924,508 | A | * | 7/1999 | Clauss et al. ................... 180/179 |
| 5,927,829 | A | * | 7/1999 | Saga et al. ..................... 303/152 |
| 6,378,636 | B1 | | 4/2002 | Worrel |

FOREIGN PATENT DOCUMENTS

| DE | 102007035424 | 1/2009 |
| EP | 1547891 | 6/2005 |
| FR | 2749229 | 12/1997 |
| JP | 08-216737 | 8/1996 |
| JP | 2001-260713 | 9/2001 |
| JP | 2002-240590 | 8/2002 |
| JP | 2006-117020 | 5/2006 |
| JP | 2007-022236 | 2/2007 |
| JP | 2007-099268 | 4/2007 |
| WO | 2009-136512 | 11/2009 |

OTHER PUBLICATIONS

European Search Report dated Jul. 19, 2013, Application No. 11753151.7, 6 pages.

* cited by examiner

*Primary Examiner* — Gertrude Arthur Jeanglaude
(74) *Attorney, Agent, or Firm* — Rankin, Hill & Clark LLP

(57) ABSTRACT

An accelerator pedal device provided with a driving control device. The driving control device generates a braking force for braking a vehicle when the operation quantity of an acceleration pedal is below a first threshold value, and generates a driving force for driving the vehicle when the operation quantity exceeds a second threshold value larger than the first threshold value. The driving control device does not generate either the driving force or the braking force, and allows the vehicle to drive inertially, when the operation quantity ranges from the first threshold value to the second threshold value.

7 Claims, 8 Drawing Sheets

ACCELERATOR PEDAL DEVICE

TECHNICAL FIELD

The present invention relates to an accelerator pedal device for controlling the generation of a driving force and a braking force on a vehicle depending on the operation quantity of an accelerator pedal.

BACKGROUND ART

There has been an accelerator pedal device for controlling the acceleration and deceleration of a vehicle based on the operation of an accelerator pedal {Japanese Laid-Open Patent Publication No. 2001-260713 (hereinafter referred to as "JP2001-260713A")}. According to JP2001-260713A, when the operation quantity of an accelerator pedal (1) is equal to or smaller than a prescribed value (T1), a throttle opening degree (E) is set to zero and the braking quantity (B) of a brake disk (14) is adjusted (see, for example, the abstract, FIGS. 2, 3, and 7 of JP2001-260713A).

There is also known an arrangement for imparting a reaction force from an actuator to an accelerator pedal depending on the operation quantity of the accelerator pedal {International Publication No. WO2009/136512 (hereinafter referred to as "WO2009/136512A")}.

SUMMARY OF INVENTION

According to JP2001-260713A, as described above, the acceleration and deceleration of a vehicle can be controlled based on the operation of an accelerator pedal. JP2001-260713A discloses that both the throttle opening degree and the braking quantity are made zero (FIG. 7 of JP2001-260713A). Although it refers to an engine brake (paragraph [0009] of JP2001-260713A), it does not refer to how the engine brake is to be handled when the throttle opening degree is made zero. Generally, when the accelerator pedal is released, an engine brake is applied. Therefore, it should be interpreted according to JP2001-260713A that when the throttle opening degree is zero, engine brake is applied. However, when an engine brake is applied, the vehicle tends to be decelerated in a manner not intended by the driver.

According to JP2001-260713A, furthermore, there is nothing which indicates whether the accelerator pedal is in an acceleration zone or a deceleration zone. Consequently, the driver finds it difficult to immediately recognize whether the accelerator pedal is in an acceleration zone or a deceleration zone.

The present invention has been made in view of the above problems. It is an object of the present invention to provide a control apparatus which is capable of preventing a vehicle from being decelerated in a manner not intended by the driver of the vehicle.

Another object of the present invention is to provide a control apparatus which allows the driver of a vehicle to easily recognize switching between the generation of a driving force and the generation of a braking force on the vehicle.

An accelerator pedal device according to the present invention includes an accelerator pedal on a vehicle, an operation quantity detector for detecting an operation quantity of the accelerator pedal, an actuator for applying a reaction force to the accelerator pedal, a reaction force controller for controlling the actuator, and a travel controller for controlling the generation of a driving force and a braking force for the vehicle, wherein the travel controller generates the braking force if the operation quantity is smaller than a first threshold value, the travel controller generates the driving force if the operation quantity is greater than a second threshold value which is greater than the first threshold value, and the travel controller generates neither the driving force nor the braking force thereby to allow the vehicle to travel by inertia if the operation quantity is greater than the first threshold value and smaller than the second threshold value.

According to the present invention, the operation quantity of the accelerator pedal is adjusted to generate the driving force and the braking force for the vehicle, and additionally to select traveling by inertia while the driving force and the braking force are not being generated. Therefore, it is possible to prevent the vehicle from being decelerated owing to the generation, not intended by the driver of the vehicle, of braking forces. In addition, the driver can positively utilize traveling by inertia when changing from acceleration to cruising, changing from acceleration or cruising to gradual deceleration, or changing from deceleration to cruising, for example.

The reaction force controller may increase the reaction force when the operation quantity changes across the first threshold value or the second threshold value. The reactive force is increased when the vehicle switches from a state wherein the driving force or the braking force is generated to a state wherein the vehicle can travel by inertia, or when the vehicle switches from the state wherein the vehicle can travel by inertia to the state wherein the driving force or the braking force is generated. Therefore, the driver is capable of easily recognizing the operation quantity for such state changes.

The first threshold value and the second threshold value may comprise threshold values for the operation quantity for switching between traveling states of the vehicle, the first threshold value may be a value at the boundary between a regenerative zone and a neutral zone, and the second threshold value may be a value at the boundary between the neutral zone and a power zone.

The reaction force controller may set the reaction value at the time the operation quantity is greater than the second threshold value to be greater than the reaction value at the time the operation quantity lies between the first threshold value and the second threshold value. The reaction force is thus smaller when the vehicle is allowed to travel by inertia than when the driving force is generated. The driver can thus positively utilize traveling by inertia. When the driving force is generated, the reaction force may be increased in view of the presence of a vehicle ahead, a curve, a traffic signal, a stop sign, etc., letting the driver know a need for deceleration.

The braking force may include a braking force generated in a regenerative mode of a traction motor on the vehicle, and the braking force generated in the regenerative mode may be greater as the operation quantity of the accelerator pedal is smaller. It is thus possible to adjust the braking force generated in the regenerative mode (the strength of a regenerative brake) depending on the operation quantity of the accelerator pedal. Consequently, the vehicle can be decelerated by the braking force generated in the regenerative mode as intended by the driver.

The accelerator pedal device may further include an operating speed detector for detecting an operating speed of the accelerator pedal, wherein the travel controller may increase the first threshold value or reduce the second threshold value if the operating speed exceeds a threshold value therefor for judging a degree of acceleration or deceleration of the vehicle. If the operating speed of the accelerator pedal is greater than the threshold value for the operating speed, therefore, the range of operation quantities which allows traveling by inertia thus becomes gradually reduced. If there is a reduced need for traveling by inertia, then the operating speed for the vehicle to change from acceleration or cruising to quick deceleration or from deceleration or cruising to quick acceleration may be set as the threshold value for the operating speed to shorten the time to start traveling by inertia for thereby quickly achieving quick acceleration or quick deceleration.

The travel controller may control the generation of a driving force and a braking force from an engine and a traction motor on the vehicle. The travel controller may control at least one of the engine and the traction motor to generate the braking force if the operation quantity is smaller than the first threshold value. The travel controller may control at least one of the engine and the traction motor to generate the driving force if the operation quantity is greater than the second threshold value. The travel controller may control both the engine and the traction motor to generate neither the driving force nor the braking force thereby to allow the vehicle to travel by inertia if the operation quantity is greater than the first threshold value and smaller than the second threshold value.

DESCRIPTION OF EMBODIMENTS

A. Embodiment

A vehicle incorporating an accelerator pedal device according to an embodiment of the present invention will be described below with reference to the drawings.

1. Configuration of Vehicle 10

Figure 1:
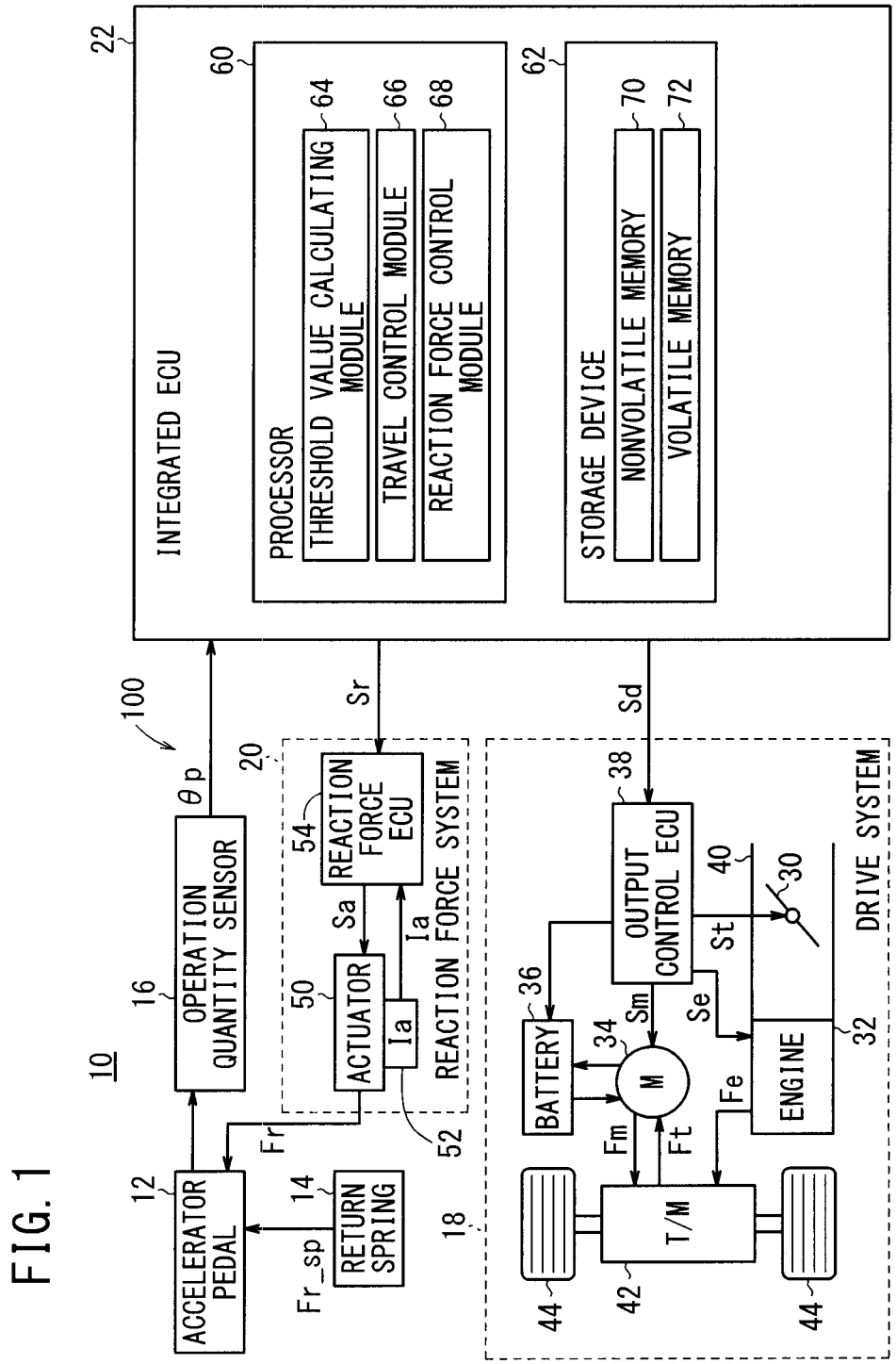
FIG. 1 is a block diagram of a vehicle incorporating an accelerator pedal device according to an embodiment of the present invention.

FIG. 1 is a block diagram of a vehicle 10 incorporating an accelerator pedal device 100 according to an embodiment of the present invention. The vehicle 10 comprises a hybrid vehicle, for example. Alternatively, the vehicle 10 may be an electric vehicle including a fuel cell vehicle. The vehicle 10 includes an accelerator pedal 12, a return spring 14 for applying a reaction force Fr_sp [N] to the accelerator pedal 12, an operation quantity sensor 16 (operation quantity detector), a drive system 18, a reaction force system 20, and an integrated electronic control unit (hereinafter referred to as "integrated ECU 22").

The operation quantity sensor 16 detects a quantity by which the accelerator pedal 12 is depressed from its original position (operation quantity θp) [degree], and outputs the detected operation quantity θp to the integrated ECU 22.

The drive system 18, which supplies drive power to the vehicle 10, includes a throttle valve 30, an engine 32, a traction motor 34, a battery 36, an output control electronic control unit (hereinafter referred to as "output control ECU 38"), an intake pipe 40, a transmission 42, and road wheels 44.

The throttle valve 30 is disposed in the intake pipe 40 which is connected to the engine 32, and has its opening degree (throttle valve opening degree θth) [degree] controlled by the output control ECU 38 depending on the operation quantity θp, etc. According to the present embodiment, specifically, a so-called throttle-by-wire system is employed wherein the throttle valve 30 has its throttle valve opening degree θth controlled by a control signal St from the output control ECU 38.

The engine 32 has its fuel injection and fuel ignition controlled based on a control signal Se from the output control ECU 38 to generate a driving force Fe depending on the injected amount of fuel, the throttle valve opening degree θth, etc.

When the vehicle 10 is in a power mode, the motor 34 generates a driving force Fm with electric power supplied from the battery 36 through an inverter, not shown, based on a control signal Sm from the output control ECU 38. The driving force Fm is transmitted alone or together with the driving force Fe from the engine 32 to the road wheels 44 through the transmission 42, thereby rotating the road wheels 44.

When the vehicle 10 is in a regenerative mode, the motor 34 functions as a regenerative brake based on the control signal Sm from the output control ECU 38. Specifically, the motor 34 generates a braking force Fbm that acts on the road wheels 44 through the transmission 42. Stated otherwise, the motor 34 generates electricity with a driving force Ft from the road wheels 44. The motor 34 thus generates regenerative electric power to charge the battery 36. Alternatively, the motor 34 may supply the regenerative electric power to auxiliary devices, not shown.

The output control ECU 38 controls the throttle valve 30, the engine 32, the motor 34, and the battery 36 according to a command (control signal Sd) from the integrated ECU 22.

The reaction force system 20 serves to apply a reaction force Fr [N] to the accelerator pedal 12. The reaction force system 20 includes an actuator 50, a current sensor 52, and a reaction force electronic control unit 54 (hereinafter referred to as "reaction force ECU 54").

The actuator 50, which comprises a motor, not shown, coupled to the accelerator pedal 12, applies the reaction force Fr depending on a control signal Sa received from the reaction force ECU 54 to the accelerator pedal 12. To the accelerator pedal 12, there is thus applied the reaction force Fr from the actuator 50 in addition to the reaction force Fr_sp generated by the return spring 14. The actuator 50 may alternatively comprise another driving force generating means (e.g., a pneumatic pressure actuator).

The current sensor 52 detects a current (consumed current Ia) [A] consumed by the actuator 50, and indicates the detected current Ia to the reaction force ECU 54. The current Ia varies depending on the output power of the actuator 50, and represents the reaction force Fr generated by the actuator

50. The reaction force ECU 54 generates the control signal Sa for the actuator 50 based on a command (control signal Sr) from the integrated ECU 22 and the current Ia, and controls the actuator 50 with the control signal Sa.

A reaction force application start switch, not shown, may be added, and may be operated by the driver of the vehicle 10 to control the integrated ECU 22 to start applying the reaction force Fr from the actuator 50 to the accelerator pedal 12.

The integrated ECU 22 serves to control the drive system 18 and the reaction force system 20 based on the operation quantity θp. The integrated ECU 22 includes a processor 60 and a storage device 62.

The processor 60 includes a threshold value calculating module 64 (operating speed detector), a travel control module 66 (travel controller), and a reaction force control module 68 (reaction force controller). The threshold value calculating module 64 calculates a second threshold value TH2, etc. that are used by the travel control module 66 and the reaction force control module 68 (as described in detail later). The travel control module 66 controls operation of the engine 32 and the motor 34 (controls the output of the drive system 18). Stated otherwise, the travel control module 66 switches between the power mode and the regenerative mode of the vehicle 10. According to the present embodiment, the vehicle 10 may not operate in either one of the power mode and the regenerative mode, but a neutral mode may be selected to allow the vehicle 10 to travel by inertia. The reaction force control module 68 controls the reaction force Fr applied from the actuator 50 to the accelerator pedal 12 (as described in detail later).

The storage device 62 has a nonvolatile memory 70 and a volatile memory 72. The nonvolatile memory 70 comprises a flash memory or an EEPROM (Electrically Erasable Programmable Read Only Memory), for example, and stores programs for controlling the processor 60 to perform processing sequences. The volatile memory 72 comprises a DRAM (Dynamic Random Access Memory), for example, and is used by the processor 60 when it performs processing sequences.

The accelerator pedal device 100 according to the present embodiment includes the accelerator pedal 12, the operation quantity sensor 16, the reaction force system 20, the integrated ECU 22, and the output control ECU 38.

2. Reaction Force Application Characteristics

Figure 2:
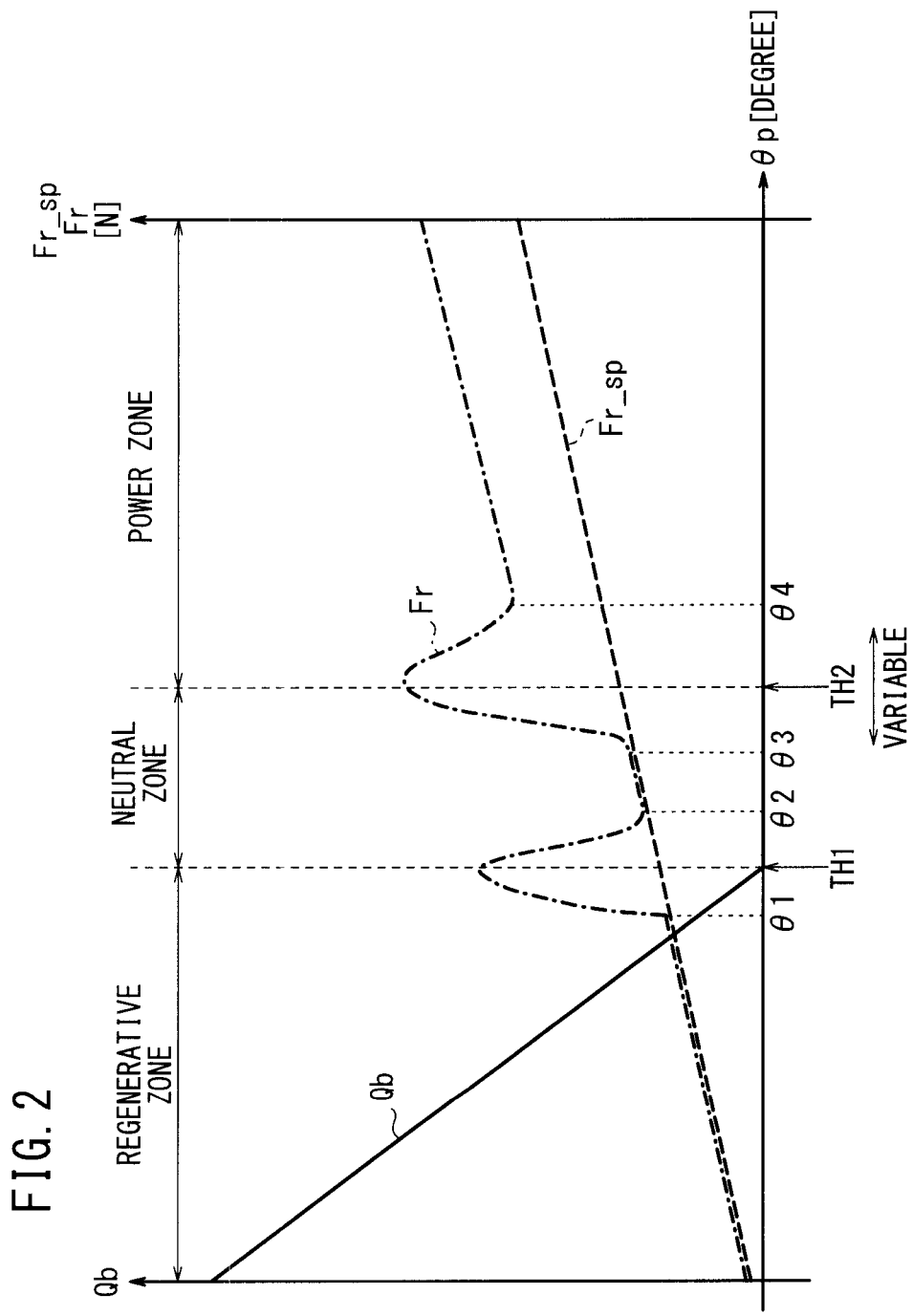
FIG. 2 is a diagram showing the relationship between the operation quantity of an accelerator pedal, the traveling state of a vehicle, the reaction force from a return spring, the reaction force from an actuator, and the regenerative braking quantity from a motor.

FIG. 2 shows the relationship between the operation quantity θp of the accelerator pedal 12, the traveling states (a power zone, a regenerative zone, and a neutral zone) of the vehicle 10, the reaction force Fr_sp from the return spring 14, the reaction force Fr from the actuator 50, and the regenerative braking quantity Qb from the motor 34.

In FIG. 2, a first threshold value TH1 and a second threshold value TH2 are threshold values for the operation quantity θp for switching between the traveling states of the vehicle 10. Specifically, the first threshold value TH1 is a value at the boundary between the regenerative zone and the neutral zone, and the second threshold value TH2 is a value at the boundary between the neutral zone and the power zone. According to the present embodiment, the first threshold value TH1 is a fixed value, and the second threshold value TH2 is a variable value. A process of setting the second threshold value TH2 will be described later.

In the power zone, at least one of the driving force Fe from the engine 32 and the driving force Fm from the motor 34 is transmitted through the transmission 42 to the road wheels 44, driving the vehicle 10.

In the regenerative zone, the motor 34 generates electricity depending on the braking force Fbm applied from the motor 34 to the road wheels 44 (the driving force Ft from the road wheels 44). At this time, the engine 32 functions as a braking means (an engine brake) by applying rotational resistance to the road wheels 44, generating a braking force Fbe on the road wheels 44.

In the neutral zone, the engine 32 and the motor 34 are disconnected from the road wheels 44 by the transmission 42, and do not generate any of the driving forces Fe, Fm, and the braking forces Fbe, Fbm for the road wheels 44. As a result, the vehicle 10 is capable of traveling by inertia (decelerating due to rolling resistance). However, since a foot brake, not shown, is available, the user can depress the foot brake pedal to decelerate the vehicle 10.

Since the second threshold value TH2 is variable, the boundary between the neutral zone and the power zone can vary, shifting the power zone.

As shown in FIG. 2, the reaction force Fr_sp generated by the return spring 14 increases as the operation quantity θp increases. The reaction force Fr generated by the actuator 50 is of a lower limit value until the operation quantity θp reaches an operation quantity θ1 and between an operation quantity θ2 and an operation quantity θ3. The reaction force Fr increases between the operation quantity θ1 and the first threshold value TH1 and between the operation quantity θ3 and the second threshold value TH2. The reaction force Fr decreases between the first threshold value TH1 and the operation quantity θ2 and between the second threshold value TH2 and an operation quantity θ4. The reaction force Fr is greater than the lower limit value between the first threshold value TH1 and the operation quantity θ2 and between the second threshold value value TH2 and an operation quantity θ4.

The reaction force Fr is greater in the power zone than in the regenerative zone and the neutral zone. In the power zone, the reaction force Fr can be applied depending on the target speed for the vehicle 10, as disclosed in WO2009/136512A, for example. Alternatively, depending on the presence of a vehicle ahead, a curve, a traffic signal, a stop sign, etc., the reaction force Fr may be increased, and a need for deceleration may be indicated to the driver.

The regenerative braking quantity Qb from the motor 34 gradually decreases until the operation quantity θp reaches the first threshold value TH1, and becomes zero when the operation quantity θp becomes equal to or greater than the first threshold value TH1. Therefore, when the operation quantity θp is in the regenerative zone, it is possible to increase or reduce the regenerative braking quantity Qb depending on the operation quantity θp. In the power zone and the neutral zone, the regenerative braking quantity Qb is made zero, so that the motor 34 will not function as a regenerative brake.

3. Calculation of the Second Threshold Value TH2

According to the present embodiment, the threshold value calculating module 64 of the integrated ECU 22 calculates the second threshold value TH2 depending on the operating speed Vp [degree/sec.] of the accelerator pedal 12.

Figure 3:
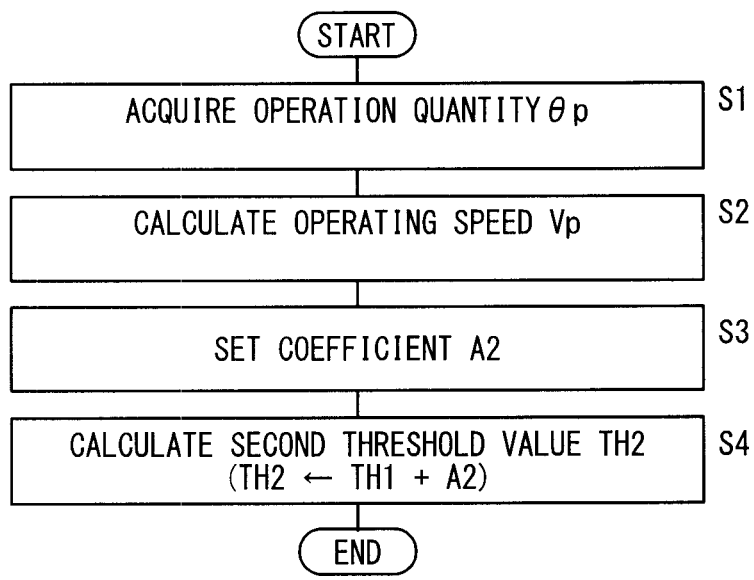
FIG. 3 is a flowchart of a sequence of operation of a threshold value calculating module of an integrated ECU for calculating a second threshold value.

FIG. 3 is a flowchart of a sequence of operation of the threshold value calculating module 64 for calculating the second threshold value TH2. In step S1, the threshold value calculating module 64 acquires the operation quantity θp from the operation quantity sensor 16. In step S2, the threshold value calculating module 64 calculates an operating speed Vp by calculating a change per unit time in the operation quantity θp.

Figure 4:
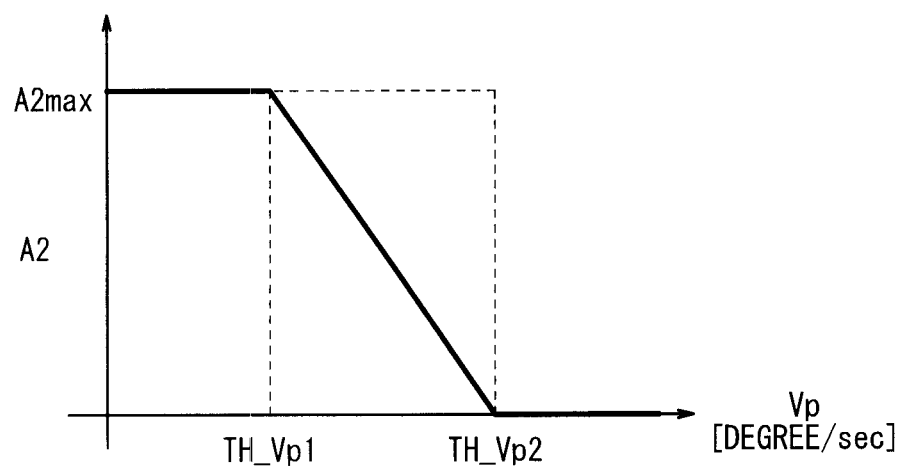
FIG. 4 is a diagram showing the relationship between the operating speed of the accelerator pedal and a coefficient used in calculating the second threshold value.

In step S3, the threshold value calculating module 64 sets a coefficient A2 depending on the operating speed Vp. FIG. 4 shows the relationship between the operating speed Vp and the coefficient A2. As shown in FIG. 4, when the operating speed Vp is equal to or smaller than a threshold value TH_Vp1, the coefficient A2 is of a maximum value A2max. When the operating speed Vp is greater than the threshold value TH_Vp1 and smaller than a threshold value TH_Vp2, the coefficient A2 gradually decreases. When the operating speed Vp is equal to or greater than the threshold value TH_Vp2, the coefficient A2 is of a minimum value (zero in the present embodiment).

The threshold values TH_Vp1, TH_Vp2 are set as follows, for example: The threshold value TH_Vp1 is set to a minimum value (an estimated value or a reference value) of the operating speed Vp which can be taken upon acceleration, and the operating speed Vp exceeds the threshold value TH_Vp1 when the vehicle 10 needs to be accelerated. The threshold value TH_Vp2 is set to a maximum value (an estimated value or a reference value) of the operating speed Vp which can be taken upon slow acceleration, and the operating speed Vp exceeds the threshold value TH_Vp2 when the vehicle 10 needs to be quickly accelerated.

In step S4 shown in FIG. 3, the threshold value calculating module 64 adds the coefficient A2 to the first threshold value TH1 which is a fixed value, thereby calculating the second threshold value TH2 (TH2=TH1+A2).

With the above arrangement, when the vehicle 10 does not need to be accelerated, the coefficient A2 and the second threshold value TH2 become maximum, and the neutral zone also becomes maximum. As a result, when necessary (e.g., when the vehicle 10 goes into a gently sloping road while cruising at a constant speed), the driver can shift the operation quantity θp of the accelerator pedal 12 into the neutral zone, thereby allowing the vehicle 10 to travel by inertia. When the vehicle 10 is to be slowly accelerated, the neutral zone is reduced so that the neutral zone can be switched easily to the power zone. When the vehicle 10 is to be quickly accelerated, the neutral zone is minimized (e.g., to zero), so that the neutral zone can be switched rapidly to the power zone.

In the above description, it is assumed that the operating speed Vp is of a positive value. The operating speed Vp in FIG. 4 can be of an absolute value. Therefore, when the vehicle 10 is to be slowly decelerated, the neutral zone is reduced, and when the vehicle 10 is to be quickly decelerated, the neutral zone is minimized (e.g., to zero). As a consequence, upon deceleration, the operation quantity θp can easily be shifted into the regenerative zone, making it possible to switch smoothly from the power mode to the regenerative mode.

4. Switching between Travel Control Modes

According to the present embodiment, the travel control module 66 of the integrated ECU 22 switches between the travel control modes (a power control mode, a regenerative control mode, a neutral control mode) of the vehicle 10 depending on the operation quantity θp of the accelerator pedal 12.

Figure 5:
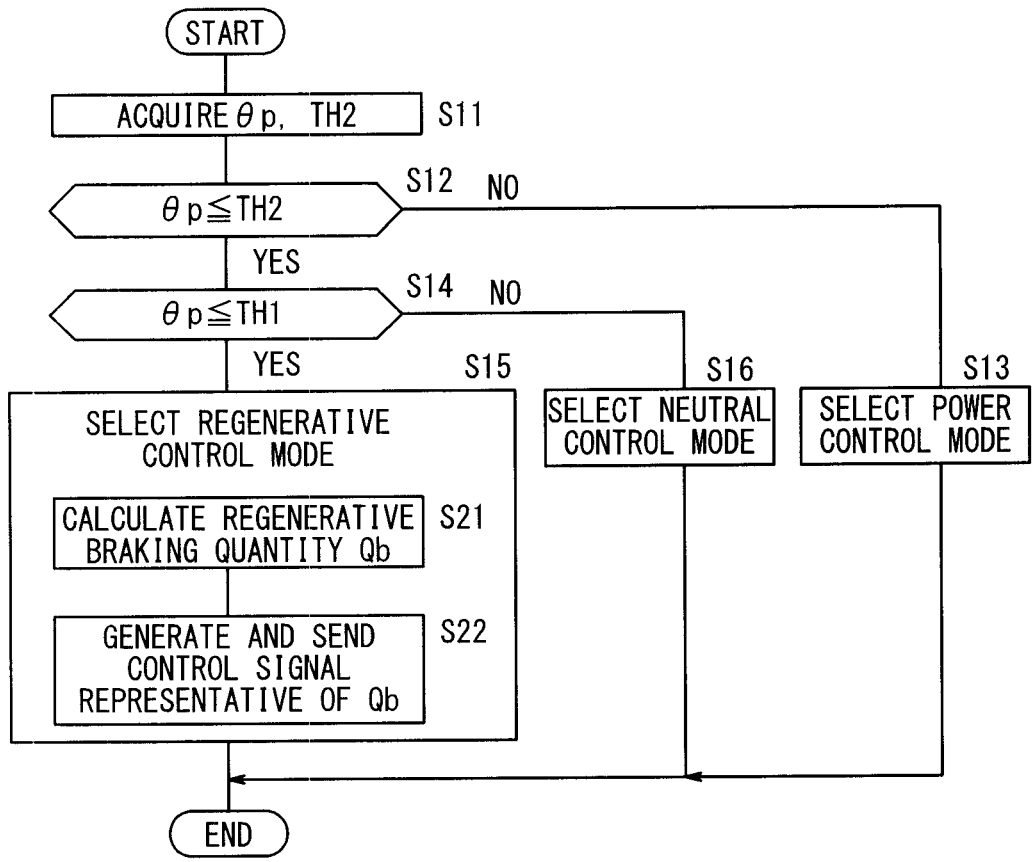
FIG. 5 is a flowchart of a sequence of operation of a travel control module of the integrated ECU for switching between travel control modes of the vehicle.

FIG. 5 is a flowchart of a sequence of operation of the travel control module 66 for switching between the travel control modes of the vehicle 10. In step S11, the travel control module 66 acquires the operation quantity θp of the accelerator pedal 12 and the second threshold value TH2 from the threshold value calculating module 64.

In step S12, the travel control module 66 judges whether or not the operation quantity θp is equal to or smaller than the second threshold value TH2. If the operation quantity θp is not equal to or smaller than the second threshold value TH2 (S12: NO), then the travel control module 66 selects the power control mode in step S13. Specifically, the travel control module 66 generates a control signal Sd for the output control ECU 38 based on the operation quantity θp of the accelerator pedal 12, etc., and controls the driving force Fe from the engine 32 and the driving force Fm from the motor 34. If the operation quantity θp is equal to smaller than the second threshold value TH2 (S12: YES), then control goes to step S14.

In step S14, the travel control module 66 judges whether or not the operation quantity θp is equal to or smaller than the first threshold value TH1. If the operation quantity θp is equal to or smaller than the first threshold value TH1 (S14: YES), then the travel control module 66 selects the regenerative control mode in step S15. Specifically, in step S21, the travel control module 66 calculates a regenerative braking quantity Qb (braking force Fbm) to be generated by the motor 34 which operates in the regenerative mode, based on the operation quantity θp of the accelerator pedal 12.

According to the present embodiment, as described above with reference to FIG. 2, when the operation quantity θp is equal to or smaller than the first threshold value TH1, the regenerative braking quantity Qb is greater as the operation quantity θp is smaller.

More specifically, the regenerative braking quantity Qb is calculated according to the following equation (1):

$$Qb = Qb\_max \times G \tag{1}$$

Where Qb_max represents a maximum value that the regenerative braking quantity Qb can take, and G a gain which is to multiply the maximum value Qb_max depending on the operation quantity θp. The gain G is defined according to the following equation (2):

$$G = (-\theta p / TH1) + 1 \tag{2}$$

As can be seen from the equation (2), the gain G becomes minimum (zero) when the operation quantity θp is equal to the first threshold value TH1, and becomes maximum when the operation quantity θp is minimum (e.g., zero).

In step S22, the travel control module 66 generates a control signal Sd representative of the regenerative braking quantity Qb, and sends the control signal Sd to the output control ECU 38. In response to the control signal Sd, the output control ECU 38 controls the motor 34 depending on the regenerative braking quantity Qb represented by the control signal Sd, generating a braking force Fbm.

In the regenerative control mode, the engine 32 functions as a braking means (an engine brake) by applying rotational resistance to the road wheels 44, generating a braking force Fbe on the road wheels 44.

In step S14, if the operation quantity θp is not equal to or smaller than the first threshold value TH1 (S14: NO), then the travel control module 66 selects the neutral control mode in step S16. Specifically, the travel control module 66 generates a control signal Sd for seeking to bring the engine 32 and the motor 34 into the neutral state, and sends the control signal Sd to the output control ECU 38. In response to the control signal Sd, the output control ECU 38 brings the engine 32 and the motor 34 into the neutral state. Thus, the driving forces Fe, Fm and the braking force Fbe, Fbm from the engine 32 and the motor 34 are not transmitted to the road wheels 44, so that the engine brake of the engine 32 and the regenerative brake of the motor 34 are not applied. As a result, the vehicle 10 can travel by inertia only. However, since the foot brake, not shown, is available, the user can depress the foot brake pedal to decelerate the vehicle 10.

The travel control module 66 repeats the operation sequence shown in FIG. 5 to change the traveling states of the vehicle 10 as required.

5. Reaction Force Control

According to the present embodiment, as described above, the reaction force control module 68 of the integrated ECU 22 controls the reaction force Fr from the actuator 50 depending on the operation quantity θp of the accelerator pedal 12.

Figure 6:
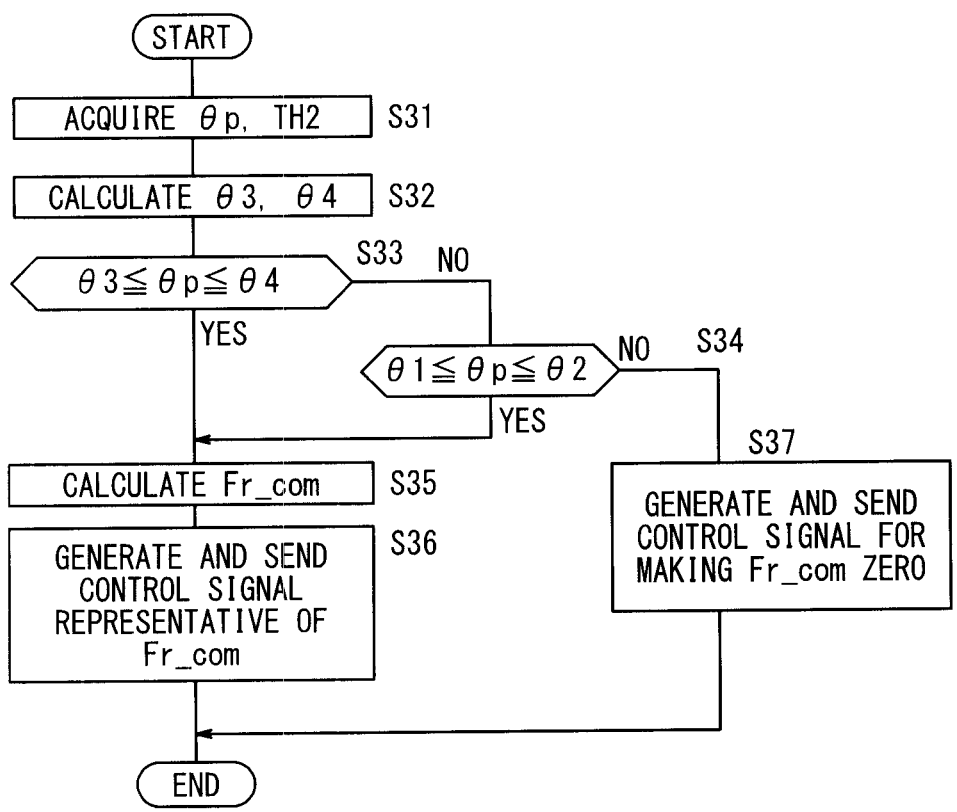
FIG. 6 is a flowchart of a sequence of operation of a reaction force control module of the integrated ECU for controlling the reaction force from the actuator.

FIG. 6 is a flowchart of a sequence of operation of the reaction force control module 68 for controlling the reaction force Fr from the actuator 50. In step S31, the reaction force control module 68 acquires the operation quantity θp of the accelerator pedal 12 and the second threshold value TH2 from the threshold value calculating module 64.

In step S32, the reaction force control module 68 calculates operation quantities θ3, θ4 based on the second threshold value TH2. Specifically, the reaction force control module 68 presets the difference between the second threshold value TH2 and the operation quantity θ3 and the difference between the operation quantity θ4 and the second threshold value TH2, and calculates the operation quantities θ3, θ4 based on the differences. As described above with reference to FIG. 2, the reaction force Fr is increased between the operation quantity θ3 and the operation quantity θ4. More specifically, the reaction force Fr increases while the operation quantity θp varies from the operation quantity θ3 to the second threshold value TH2, and decreases while the operation quantity θp varies from the second threshold value TH2 to the operation quantity θ4.

In step S33, the reaction force control module 68 judges whether the operation quantity θp is equal to or greater than the operation quantity θ3 and is equal to or smaller than the operation quantity θ4. If the operation quantity θp is neither equal to nor greater than the operation quantity θ3 or is neither equal to nor smaller than the operation quantity θ4 (S33: NO), then control goes to step S34. If the operation quantity θp is equal to or greater than the operation quantity θ3 and is equal to or smaller than the operation quantity θ4 (S33: YES), then control goes to step S35.

In step S34, the reaction force control module 68 judges whether the operation quantity θp is equal to or greater than the operation quantity θ1 and is equal to or smaller than the operation quantity θ2. If the operation quantity θp is equal to or greater than the operation quantity θ1 and is equal to or smaller than the operation quantity θ2 (S34: YES), then control goes to step S35. If the operation quantity θp is neither equal to nor greater than the operation quantity θ1 or is neither equal to nor smaller than the operation quantity θ2 (S34: NO), then control goes to step S37.

In step S35, the reaction force control module 68 calculates a command value for the reaction force Fr (reaction force command value Fr_com) to be generated by the actuator 50 depending on the operation quantity θp.

Since the reaction force Fr has characteristics shown in FIG. 2, when the operation quantity θp of the accelerator pedal 12 is reduced from a value greater than the operation quantity θ4 in the power zone, it enters the neutral zone after the reaction force Fr has increased. Similarly, when the operation quantity θp of the accelerator pedal 12 is reduced from a value greater than the operation quantity θ2 in the neutral zone, it enters the regenerative zone after the reaction force Fr has increased.

When the operation quantity θp of the accelerator pedal 12 is increased from a value smaller than the operation quantity θ1 in the regenerative zone, it enters the neutral zone after the reaction force Fr has increased. Similarly, when the operation quantity θp of the accelerator pedal 12 is increased from a value smaller than the operation quantity θ3 in the neutral zone, it enters the power zone after the reaction force Fr has increased.

Therefore, the user is able to recognize whether the present traveling state is the power state, the regenerative state, or the neutral state due to the increase in the reaction force Fr.

In step S36 shown in FIG. 6, the reaction force control module 68 generates a control signal Sr representative of the reaction force command value Fr_com, and sends the control signal Sr to the reaction force ECU 54. In response to the control signal Sr, the reaction force ECU 54 controls the actuator 50 based on the reaction force command value Fr_com represented by the control signal Sr.

In step S37, the reaction force control module 68 generates a control signal Sr for making the reaction force command value Fr_com zero, and sends the control signal Sr to the reaction force ECU 54. In response to the control signal Sr, the reaction force Fr applied by the actuator 50 is made zero by the reaction force ECU 54.

The reaction force control module 68 repeats the operation sequence shown in FIG. 6 to control the reaction force Fr from the actuator 50.

6. Comparison of the Present Embodiment and a Comparative Example

Figure 7:
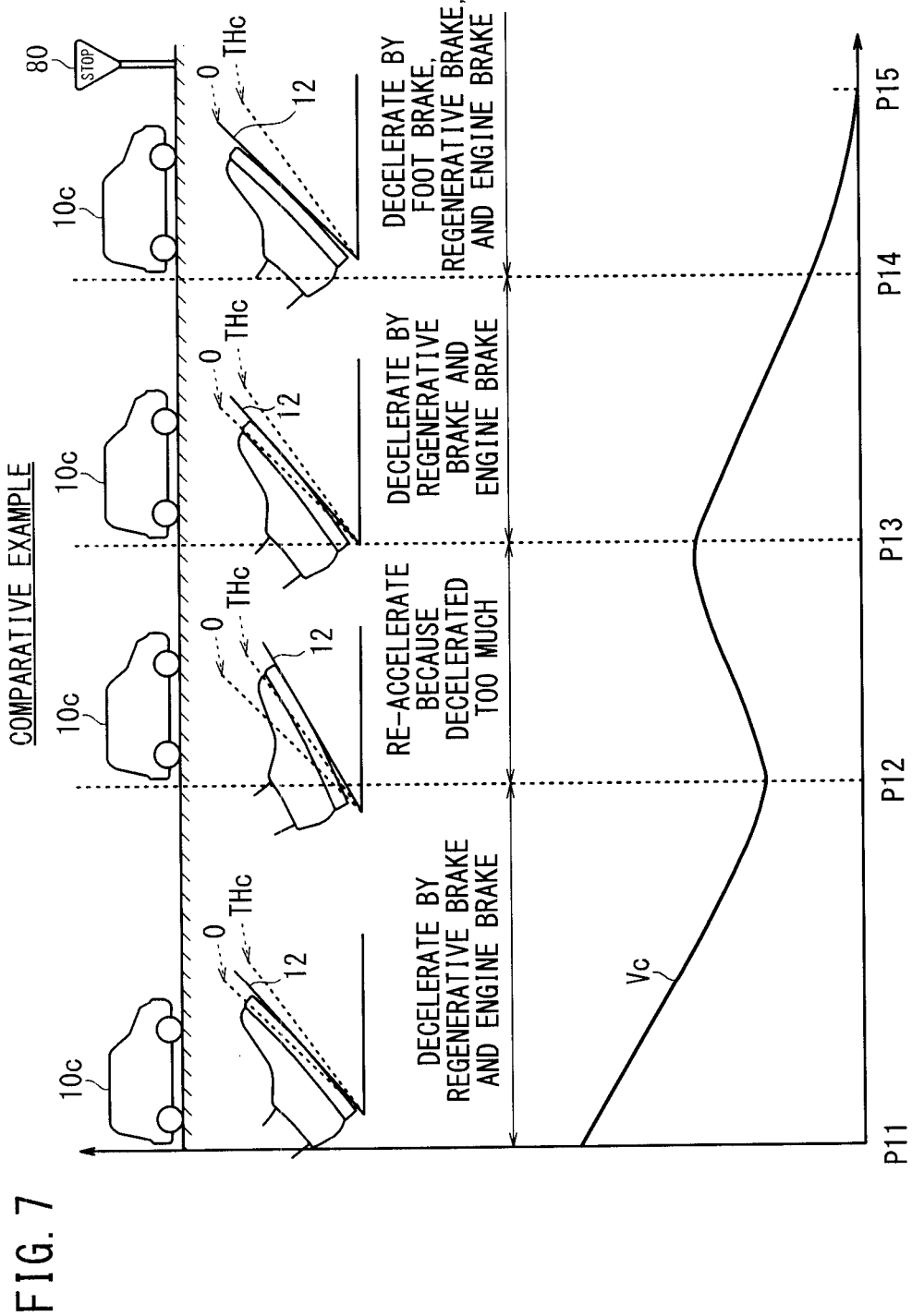
FIG. 7 is a diagram illustrating, by way of example, the manner in which a vehicle according to a comparative example stops at a stop sign.
Figure 8:
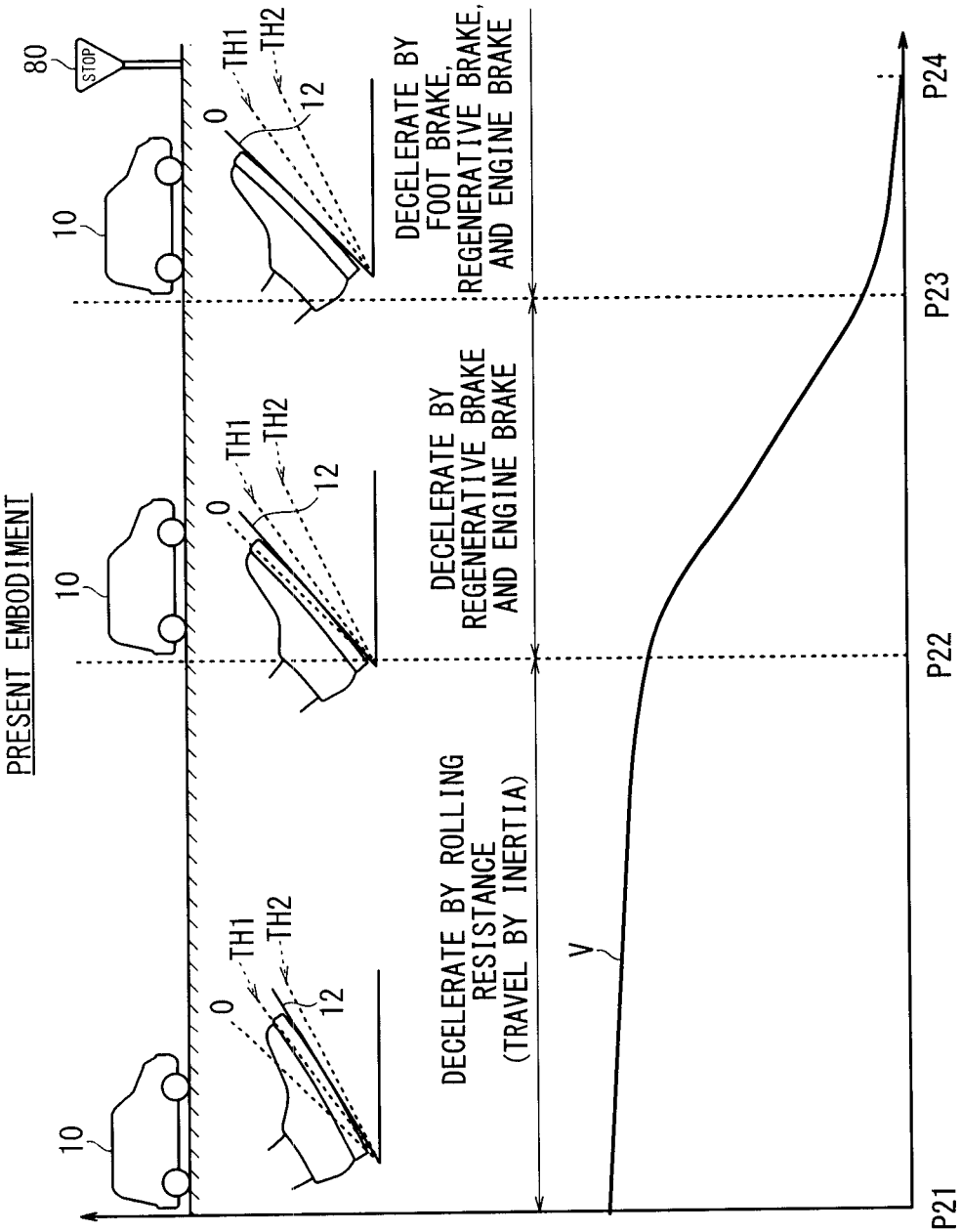
FIG. 8 is a diagram illustrating, by way of example, the manner in which the vehicle according to the embodiment stops at a stop sign.

The vehicle 10 according to the present embodiment and a vehicle 10c according to a comparative example will be compared with each other at the time they stop at a stop sign 80. FIG. 7 illustrates, by way of example, the manner in which the vehicle 10c according to the comparative example stops at the stop sign 80. FIG. 8 illustrates, by way of example, the manner in which the vehicle 10 according to the present embodiment stops at the stop sign 80. According to the comparative example, as disclosed in JP2001-260713A, only the power zone and the regenerative zone shown in FIG. 2 are used. In FIG. 7, the threshold values in the power zone and the regenerative zone according to the comparative example are referred to as a threshold value THc.

At a point P11 shown in FIG. 7, the driver who has noticed the stop sign 80 releases the accelerator pedal 12 to make the operation quantity θp smaller than the threshold value THc, bringing the vehicle 10c into the regenerative mode. As a result, both the regenerative brake applied by the motor 34 and the engine brake applied by the engine 32 start to function, so that the speed Vc [km/h] of the vehicle 10c gradually decreases.

At a point P12, the driver notices that the vehicle 10c is decelerated too much, and depresses the accelerator pedal 12 to make the operation quantity θp greater than the threshold value THc, bringing the vehicle 10c back into the power mode. As a result, the drive forces Fe, Fm from at least one of the engine 32 and the motor 34 is transmitted to the road wheels 44, causing the speed Vc of the vehicle 10c to increase gradually.

At a point P13, the driver releases the accelerator pedal 12 to make the operation quantity θp smaller than the threshold value THc, bringing the vehicle 10c back into the regenerative mode. As a result, both the regenerative brake applied by the motor 34 and the engine brake applied by the engine 32 start to function, so that the speed Vc of the vehicle 10c gradually decreases.

At a point P14, the driver depresses the foot brake, not shown, reducing the speed Vc of the vehicle 10c which is in the regenerative mode. As a consequence, the vehicle 10c stops at a point P15 where the stop sign 80 exists.

The vehicle 10 according to the present embodiment behaves as follows, for example. At a point P21 shown in FIG. 8, the driver who has noticed the stop sign 80 releases the accelerator pedal 12 to bring the operation quantity θp to a value between the first threshold value TH1 and the second threshold value Th2. The engine 32 and the motor 34 are now in the neutral state, so that the vehicle 10 decelerates by inertia (rolling resistance). As a result, the speed V [km/h] of the vehicle 10 more gradually decreases than in the regenerative mode. At this time, since the fuel stops being supplied to the engine 32, it is possible to improve the mileage.

At a point P22, in order to operate the regenerative brake applied by the motor 34 and the engine brake applied by the engine 32, the driver releases the accelerator pedal 12 to make the operation quantity θp smaller than the first threshold value TH1, bringing the vehicle 10 into the regenerative mode. As a result, the speed V of the vehicle 10 is reduced by the regenerative brake and the engine brake.

At a point P23, the driver depresses the foot brake, not shown, reducing the speed V of the vehicle 10 which is in the regenerative mode. As a consequence, the vehicle 10 stops at a point P24 where the stop sign 80 exists.

According to the present embodiment, as can be understood from the above description, the vehicle 10 can smoothly be decelerated and has its mileage improved compared with the comparative example.

7. Advantages of the Present Embodiment

According to the present embodiment, as described above, the operation quantity θp of the accelerator pedal 12 is adjusted to select the neutral state in addition to the power mode and the regenerative mode of the vehicle 10. Therefore, it is possible to prevent the vehicle 10 from being decelerated owing to the generation, not intended by the driver, of the braking forces Fbe, Fbm (when the engine brake or the regenerative brake is applied). In addition, the driver can positively utilize traveling by inertia when changing from acceleration to cruising, changing from acceleration or cruising to gradual deceleration, or changing from deceleration to cruising, for example.

According to the present embodiment, the reactive force Fr is increased when the power mode or the regenerative mode switches to the neutral state or when the neutral state switches to the power mode or the regenerative mode. Therefore, the driver is capable of easily recognizing the operation quantity θp for such mode changes.

According to the present embodiment, the reaction force control module 68 of the integrated ECU 22 sets the reaction force Fr at the time the operation quantity θp exceeds the operation quantity θ4, to a value greater than the reaction force Fr at the time the operation quantity θp lies between the operation quantity θ2 and the operation quantity θ3 (see FIG. 2). Consequently, the reaction force Fr is smaller in the neutral zone than in the power zone. The driver can thus positively utilize traveling by inertia. In the power zone, the reaction force Fr is increased in view of the presence of a vehicle ahead, a curve, a traffic signal, a stop sign, etc., letting the driver know a need for deceleration.

According to the present embodiment, the regenerative braking quantity Qb (braking force Fbm) from the motor 34 is greater as the operation quantity θp of the accelerator pedal 12 is smaller. Consequently, it is possible to adjust the generative braking quantity Qb (braking force Fbm) in the regenerative mode depending on the operation quantity θp. Accordingly, it is possible to decelerate the vehicle 10 with the braking force Fbm in the regenerative mode as intended by the driver.

The threshold value calculating module 64 of the integrated ECU 22 gradually reduces the second threshold TH2 if the operating speed Vp (absolute value) of the accelerator pedal 12 exceeds the threshold value TH_Vp1 (see, e.g., FIG. 4). Therefore, if the operating speed Vp exceeds the threshold value TH_Vp1, the range of operation quantities θp which allows traveling by inertia (i.e., the neutral zone) becomes gradually reduced. If there is a reduced need for traveling by inertia, then the operating speed Vp for quick deceleration or quick acceleration may be set as the threshold value TH_Vp1 to shorten the time to start traveling by inertia for thereby quickly achieving quick acceleration or quick deceleration. Stated otherwise, if the operating speed Vp (absolute value) is smaller than the threshold value TH_Vp2, the threshold value calculating module 64 gradually increases the second threshold value TH2 (see FIG. 4, etc.). Therefore, if the operating speed Vp is smaller than the threshold value TH_Vp2, the range of operation quantities θp which allows traveling by inertia (i.e., the neutral zone) is widened. If there is an increased need for traveling by inertia, then the operating speed Vp as when the vehicle 10 goes down a gently sloping road or a traffic signal at a relatively distant position turns red may be set as the threshold value TH_Vp2, to lengthen the time to start traveling by inertia for thereby improving the mileage.

B. Modifications

The present invention is not limited to the above embodiment, but may employ various arrangements based on the contents of the disclosure of the present description. For example, the present invention may employ the following arrangements:

In the above embodiment, the vehicle 10 is illustrated as a hybrid vehicle. However, the vehicle 10 may be an electric vehicle including a fuel cell vehicle.

In the above embodiment, both the regenerative brake and the engine brake start to function when the operation quantity θp of the accelerator pedal 12 is in the regenerative zone. However, only either one of the regenerative brake and the engine brake may start to function. In the above embodiment, when the operation quantity θp of the accelerator pedal 12 is in the regenerative zone, the regenerative braking quantity Qb is greater as the operation quantity θp is smaller (see FIG. 2). In the regenerative zone, however, the regenerative braking quantity Qb may be constant regardless of the value of the operation quantity θp.

In the above embodiment, the reaction force Fr at the time the operation quantity θp is in the power zone (more accurately, at the time the operation quantity θp is greater than the operation quantity θ4) is set to be greater than the reaction force Fr at the time the operation quantity θp is in the neutral zone (more accurately, at the time the operation quantity θp is greater than the operation quantity θ2 and smaller than the operation quantity θ3). However, the reaction force Fr may remain the same when operation quantity θp is in the power zone and when the operation quantity θp is in the neutral zone.

In the above embodiment, the first threshold value TH1 is a fixed value and the second threshold value TH2 is a variable. However, the first threshold value TH1 may be a variable and the second threshold value TH2 may be a fixed value. According to such a modification, when the operating speed Vp increases, the first threshold value TH1 is increased to reduce the neutral zone. Alternatively, both the first threshold value TH1 and the second threshold value TH2 may be fixed values or variables.

The invention claimed is:

1. An accelerator pedal device comprising:
an accelerator pedal on a vehicle;
an operation quantity detector for detecting an operation quantity of the accelerator pedal;
an actuator for applying a reaction force to the accelerator pedal;
a reaction force controller for controlling the actuator; and
a travel controller for controlling the generation of a driving force and a braking force for the vehicle;
wherein the travel controller generates the braking force if the operation quantity is smaller than a first threshold value;
the travel controller generates the driving force if the operation quantity is greater than a second threshold value which is greater than the first threshold value;
the travel controller generates neither the driving force nor the braking force thereby to allow the vehicle to travel by inertia if the operation quantity is greater than the first threshold value and smaller than the second threshold value;
the first threshold value and the second threshold value comprise threshold values for the operation quantity for switching between traveling states of the vehicle;
the first threshold value is a value at a boundary between a regenerative zone and a neutral zone; and
the second threshold value is a value at a boundary between the neutral zone and a power zone.

2. The accelerator pedal device according to claim 1, wherein the braking force includes a braking force generated in a regenerative mode of a traction motor on the vehicle; and
the braking force generated in the regenerative mode is set depending on the operation quantity of the accelerator pedal.

3. The accelerator pedal device according to claim 1, wherein the braking force generated in the regenerative mode is greater as the operation quantity of the accelerator pedal is smaller.

4. The accelerator pedal device according to claim 1, wherein the reaction force controller sets a reaction force increase zone in which the reaction force when the operation quantity changes across the first threshold value or the second threshold value is increased more than the reaction force when the operation quantity lies in another zone.

5. The accelerator pedal device according to claim 4, wherein the reaction force controller sets the reaction force in a zone in which the operation quantity is greater than the second threshold value except for the reaction force increase zone, to be greater than the reaction force in a zone in which the operation quantity lies between the first threshold value and the second threshold value except for the reaction force increase mode.

6. The accelerator pedal device according to claim 1, further comprising:
an operating speed detector for detecting an operating speed of the accelerator pedal;
wherein the travel controller increases the first threshold value or reduces the second threshold value if the operating speed exceeds a threshold value therefor for judging a degree of acceleration or deceleration of the vehicle.

7. The accelerator pedal device according to claim 1, wherein the travel controller controls generation of a driving force and a braking force from an engine and a traction motor on the vehicle;
the travel controller controls at least one of the engine and the traction motor to generate the braking force if the operation quantity is smaller than the first threshold value;
the travel controller controls at least one of the engine and the traction motor to generate the driving force if the operation quantity is greater than the second threshold value; and
the travel controller controls both the engine and the traction motor to generate neither the driving force nor the braking force thereby to allow the vehicle to travel by inertia if the operation quantity is greater than the first threshold value and smaller than the second threshold value.

* * * * *